1,793,664

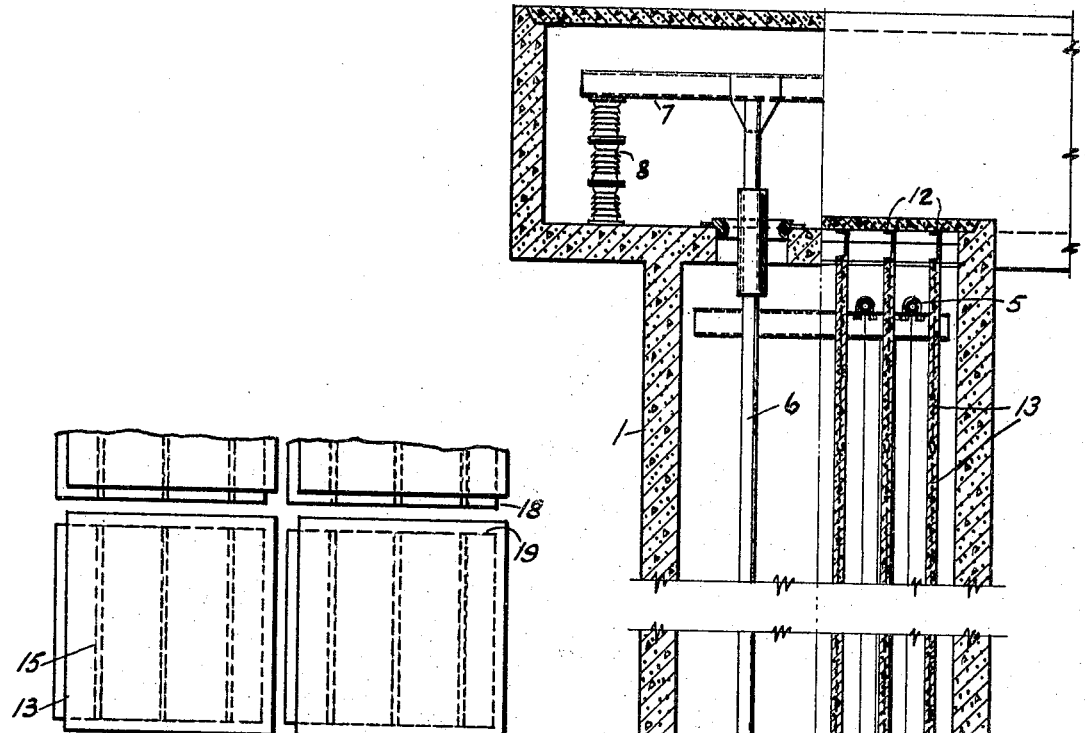
Fig. 2.
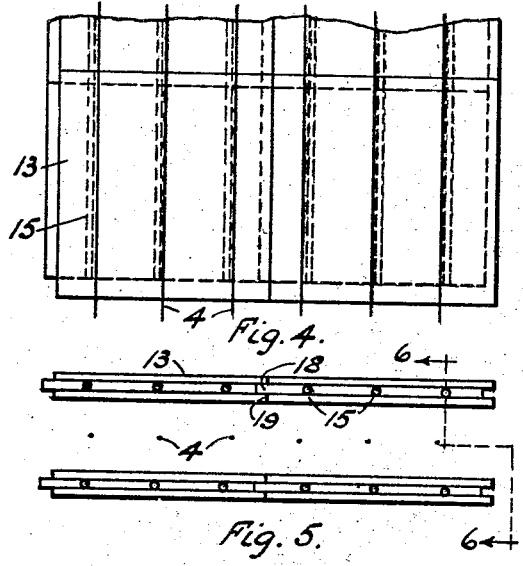
Fig. 3.
Fig. 4.
Fig. 5.

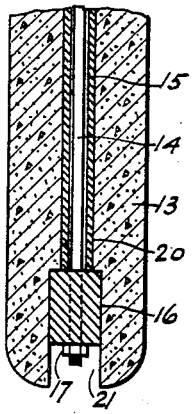
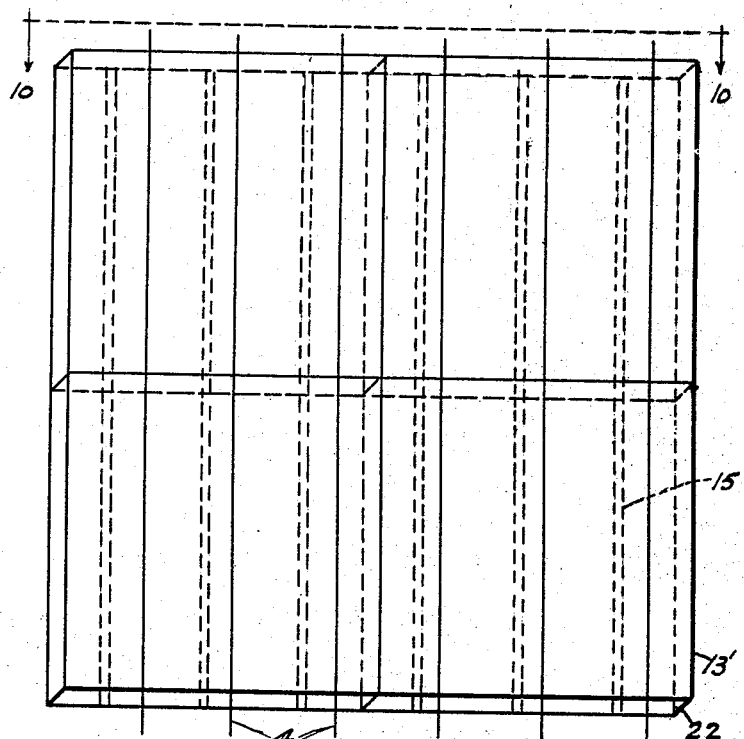
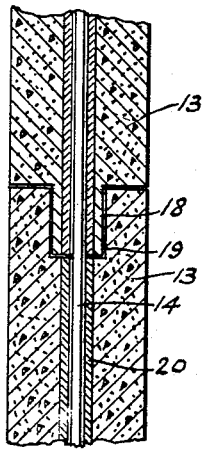
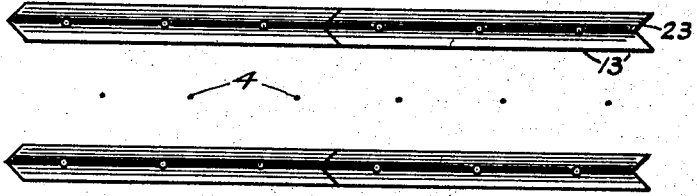
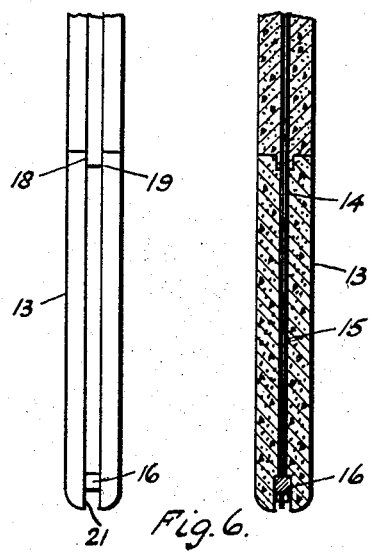

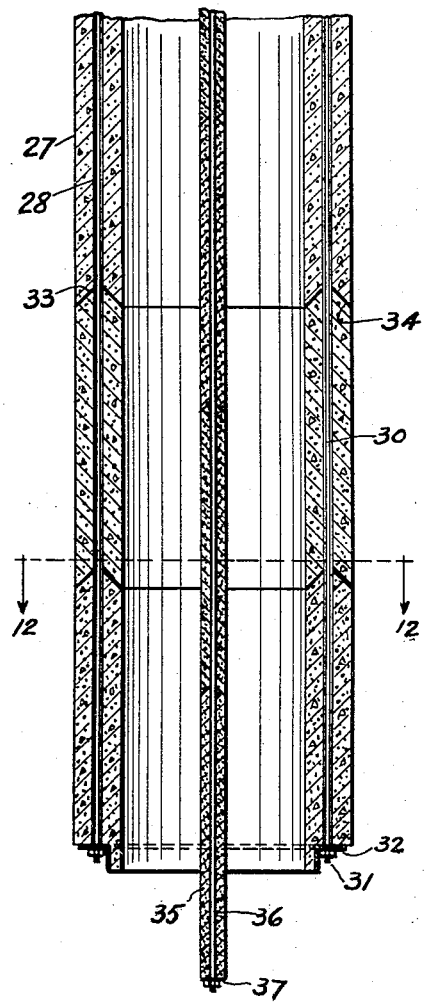
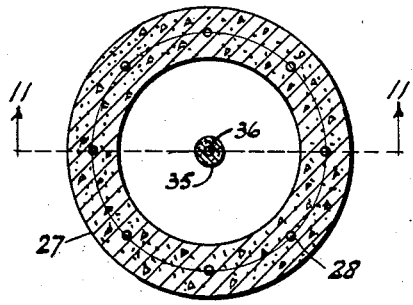
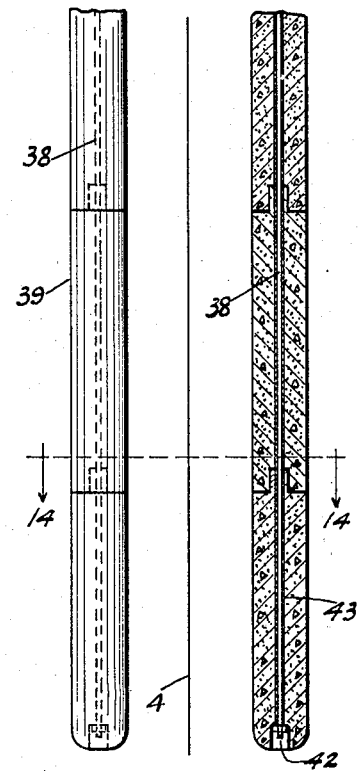
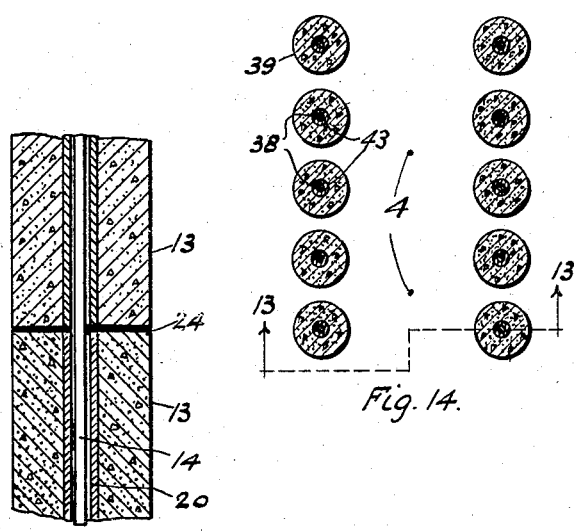
Fig. 11. Fig. 12. Fig. 13. Fig. 14. Fig. 15.
INVENTOR.
Evald Anderson.
BY
ATTORNEYS Patented Feb. 24, 1931

UNITED STATES PATENT OFFICE

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR ELECTRICAL PRECIPITATION OF SUSPENDED MATERIAL FROM GASES

Application filed December 11, 1926. Serial No. 154,131.

This invention relates to an apparatus for separation of suspended materials from gases by electrical action, in which the gas to be treated is passed between electrodes maintained at high potential difference, and so constructed and arranged as to provide for electrical discharge into the gases, and consequent electrical precipitation of suspended material on the electrodes.

It has been found advantageous in certain cases to use electrodes of semi-conducting material, for example concrete or cement material, as set forth in patent to Evald Anderson No. 1,541,677, June 9, 1925. In practice it is generally necessary to make the electrodes of considerable height and of relatively small thickness, and it has been found that cement or concrete electrodes of any considerable height and width with the requisite relatively small thickness are liable to buckle or deform under certain conditions of actual operation, particularly where the gases to be treated are such as to subject the electrodes to high temperature or to violent fluctuations of temperature. The resulting deformation of the electrodes leads to serious difficulties as it causes irregularity in the electrode spacing which interferes with the action of the precipitator. In some cases it has been necessary to break or crack the electrodes after they have thus become warped in order to straighten them so as to maintain the apparatus in operative condition. Such procedure while it is effective in most cases, is undesirable on account of the delay and expense involved in the straightening operation.

The main object of the invention is to provide for construction of the semi-conducting electrodes in such manner as to automatically maintain themselves in straightened condition under circumstances which would cause warping or deformation of a solid cement or concrete electrode. This object I attain by forming the electrodes in sections which are strung or mounted on metallic suspension members extending within the electrodes, as hereinafter described.

The accompanying drawings illustrate embodiments of my invention, and referring thereto:

Fig. 2 is a transverse section of said precipitator and the left half being taken on line a—a and the right half being taken on line b—b in Fig. 1.

Fig. 3 is an enlarged partial elevation of several sections of the collecting electrodes in detached position.

Fig. 4 is a similar view showing said sections in assembled position.

Fig. 5 is a plan of the portion of the collecting electrode shown in Fig. 4.

Fig. 6 is a section on line 6—6 in Fig. 5.

Fig. 7 is an enlarged section of the lower portion of one of the collecting electrodes showing the manner in which the same is supported on the suspension rods.

Fig. 8 is an enlarged section of a portion of the collecting electrode showing a manner in which the joint is formed between the adjacent sections.

Fig. 9 is a side elevation and Fig. 10 is a plan view showing modified form of plate type electrode.

Fig. 11 is a vertical section on line 11—11 in Fig. 12 of a portion of an electrical precipitator of flue type, constructed according to my invention.

Fig. 12 is a section on line 12—12 in Fig. 11.

Fig. 13 is a vertical section of a modified form of a plate type collecting electrode taken on line 13—13 in Fig. 14.

Fig. 14 is a horizontal section on line 14—14 in Fig. 13.

Fig. 15 is a partial vertical section showing a modification of my invention in which the overlapping of the semi-conducting electrode material at the joints is dispensed with.

Figure 1:
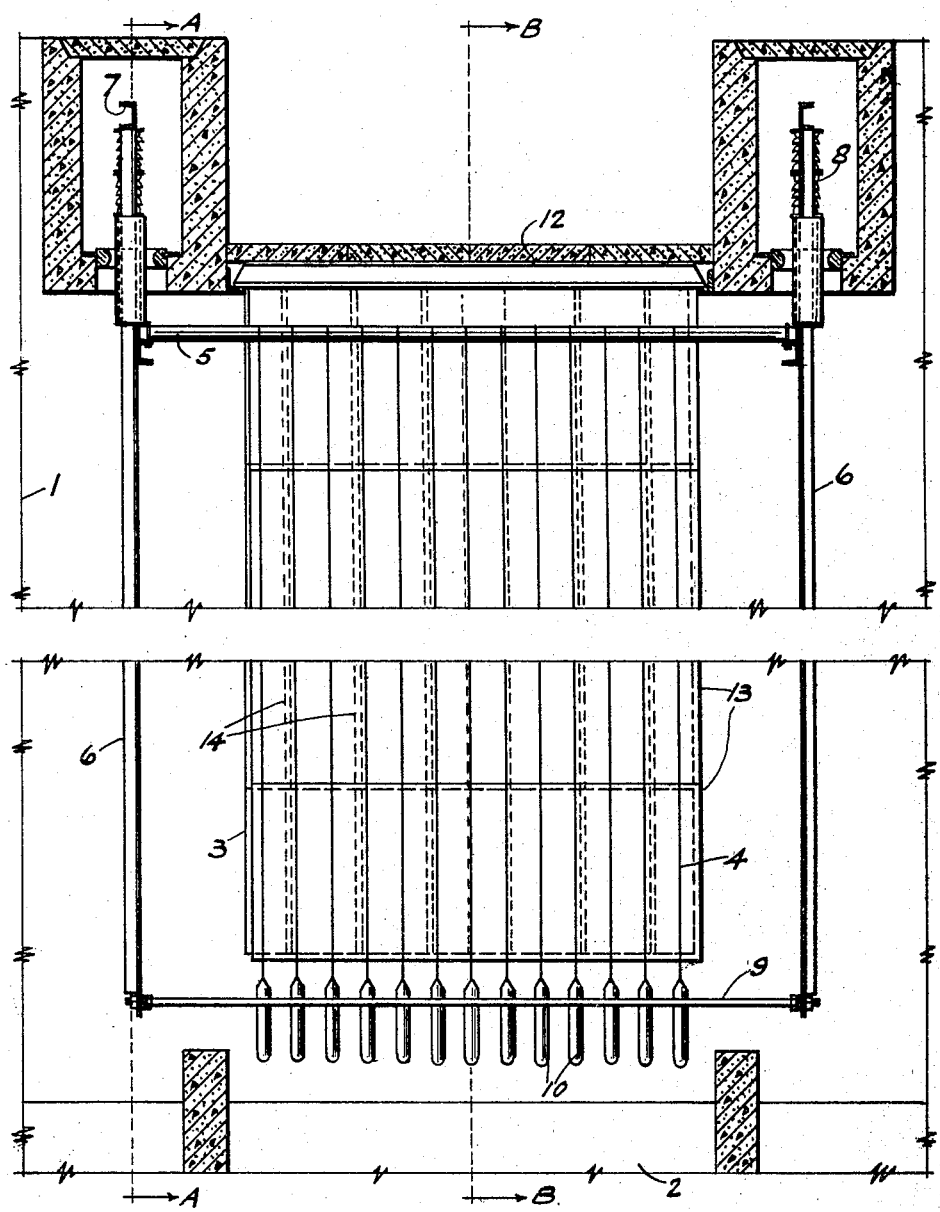
Fig. 1 is a longitudinal vertical section of an electrical precipitator provided with collecting electrodes of the plate type constructed according to this invention.

The form of electrical precipitators shown in Figs. 1 and 2 comprises a flue or casing 1 which is adapted to form or define a passage way for the gases to be treated, said casing or flue being provided at its bottom with a hopper or bin 2 for receiving the suspended material which has been separated from the gases under treatment, and suitable electrodes being mounted and arranged within said flue for effecting the electrical precipitating action. Said electrodes comprise collecting electrodes 3 and discharge electrodes 4.

The discharge electrodes are of suitable conducting material such as metal, for example, wires or rods, mounted in supporting frames 6 which are carried by beams 7 resting on insulators 8. In the drawing a plurality of the discharge electrode frames are shown, arranged in parallel relation, the discharge electrode wires or rods 4 being suspended from the top bar 5 of each frame and being spaced or held from displacement by the lower bar 9 of each frame. Discharge members 4 may also be provided with tensioning weights 10 at their lower ends.

The collecting electrodes 3 in the form shown in Figs. 1 and 2 are formed as vertical plates mounted in parallel relation within the flue, alternating with the sets of discharge electrodes, so that each set or row of discharge electrodes 4 is opposite collecting electrodes 3 at each side thereof, the spacing of the discharge and collecting electrodes being such as to provide for the required electrostatic field strength according to the conditions of practice. Each collecting electrode is preferably suspended from a top beam 12 which may consist of a steel I-beam or channel beam and each collecting electrode comprises a plurality of sections 13 of high resistance or semi-conducting material such as concrete, cement, terra cotta, etc. which are suspended from or supported by means of suitable suspension rods or members 14 connected at their upper ends to the supporting beams 12 and extending downwardly through and completely enveloped by the respective sections 13, each of said suspension members being in tensile connection throughout its length. Each section 13 is provided with vertical channels or passages 15 for receiving the suspending rods 14 and suitable means are provided at the lower ends of suspending rods 14 for supporting the respective sections 13. For this purpose a bottom beam or member 16 may extend along the bottom of each collecting electrode underneath all of the sections thereof, said beam 16 being mounted on and supported by nuts 17 screwing on the lower ends of the suspension rods 14. It will be understood that the suspension members 14, although preferably formed as rods, may be any suitable construction providing the elongated shape required for stringing and supporting the electrode sections thereon, for example, strips, wires, cables or bars may be used in place of rods, and it will be understood that any of such constructions will be the equivalent of a rod, for the purpose of my invention.

Each collecting electrode is assembled by threading the respective sections 13 on to the suspension rods 14 so that each section abuts or rests against each adjacent section, the bottom beam 16 being then placed into position beneath the lowermost sections and then fastened by nuts 17 so as to hold the sections in contact with one another and with the top and bottom beams. With collecting electrodes of large dimensions, I prefer to divide the electrode both horizontally and vertically as indicated in Fig. 1, but in special cases it may be sufficient to divide the electrode vertically only or horizontally only as the case may be. When the electrode thus assembled is placed in position in the treater as shown in Figs. 1 and 2 it hangs vertically and the force of gravity insures the alignment of the sections with one another so as to give a substantially true or flat surface to the electrode as a whole, it being understood that each section is of sufficiently small dimensions both horizontally and vertically to insure that any warping of same that may take place will not cause material deformation of the collecting electrode as a whole. To further assist in holding the collecting electrode section in alignment as well as to guard against passage of electrical discharge directly to the metallic supporting rods, through the cracks or joints between adjacent sections, I prefer to provide them with interlocking tongue and groove means as indicated at 18 and 19 in Figs. 3 to 6 and 8 so that the plate sections overlap or interlock both horizontally and vertically, and there is provided a wall of semi-conducting material between every part of the metallic supporting means 14 and the opposing electrode. In order to strengthen the collecting electrode plate sections and also increase the conductive contact of the same with the suspension rods I prefer to provide each section with a metallic sleeve, tube or pipe 20 in each passage 15 thereof, said sleeve, pipe or tube being preferably molded or embedded in the concrete, cement or other semi-conducting material of the sections and fitting more or less closely on the corresponding suspension rod 14. I prefer to make the lowermost section as shown in Fig. 7 with a bottom groove 21 to receive the supporting beam 16, the concrete or cement material of the section extending down each side of said supporting beam so as to shield the same and prevent direct passage of disruptive discharge from the discharge electrodes to said supporting beam.

The overlapping or interlocking of adjacent sections may be accomplished by providing them with V-shaped edges as shown at 22 in Figs. 9 and 10 adapted to fit in V-shaped grooves 23 in adjacent sections 13'. In some cases the interlocking or overlapping of the adjacent sections may be done away with, the adjacent sections abutting squarely against one another as shown at 24 in Fig. 15, where the sections indicated at 13'' are constructed as above described except that they are not provided with any interlocking means.

The semi-conducting electrode members on metallic suspension rods may also be applied to electrical precipitation of the flue type. For example, as shown in Figs. 11 and 12 the collecting electrode in the form of a vertical flue or pipe may consist of a plurality of tubular sections indicated at 27 each provided with vertical passages or channels 28 fitting over suspension rods 30 which are connected at their upper ends with any suitable supporting means and are provided at their lower ends with nuts 31 supporting a ring 32 on which the lowermost section 27 rests. Each section 27 is of suitable semi-conducting material such as concrete, cement, terra cotta, etc., and adjacent sections may be provided, if desired, with overlapping or interlocking means, for example, with V-shaped channels 33 and V-shaped ridges 34 engaging in such channels. The same principle of construction may also be applied, as shown in Figs. 11 and 12, to the discharge electrode which may consist, in that case of a vertical series of tubular sections 35 of cement, concrete, terra cotta, etc., or similar semi-conducting material, strung or threaded on a suspension rod 36 which is provided at its lower end with a nut 37 for supporting said sections and is supported at its upper end on any suitable supporting means which is insulated in the usual manner. Figs. 13 and 14 illustrate the application of my invention to collecting electrodes of the divided type, each collecting electrode comprising a series of electrode members which are separated from one another but which are spaced close enough together to produce approximately, as regards the electrostatic field the effect of a substantially continuous surface. Each such electrode member may consist of a supporting wire or rod 38 supported at its upper end by any suitable supporting means and a plurality of tubular sections or sleeves 39 of suitable semi-conducting material such as above described, which are threaded or strung on said supporting rods or wires and are held in position by means of nuts 42 at the lower end of said rods or wires. Metallic sleeves 43 may be provided in the respective sections 39 said sleeves fitting over the suspension rod 38 and being molded or cast into the sections so as to ensure effective conductive contact.

It is to be understood that in each of the above forms of my invention means will be provided for connecting the discharge electrodes to a source of high potential electrical current, for example, the discharge electrode system may be connected to rectifying apparatus for supplying the electrical precipitator with rectified alternating current, the collecting electrodes being assumed to be grounded and said rectifying apparatus also having ground connection for completing the circuit. In the operation of the apparatus a potential difference of say 50,000 to 100,000 volts, according to the electrical spacing of the apparatus and to the nature of the gas to be treated, is maintained between the discharge and collecting electrode systems above described, and the gas to be treated is passed through the gas passages defined by the collecting electrodes and in contact with the collecting and discharge electrodes. The high potential difference maintained between said electrodes results in electrical discharge from the discharge electrodes and consequent precipitation of suspended material by electrical action on the electrodes particularly upon the collecting electrodes. In some cases the above described apparatus may also be used for agglomeration of suspended matter in the gases by maintaining the discharge and collecting electrodes at a suitable alternating high potential difference.

While the above described construction is especially adapted to installations in which the collecting electrodes are suspended from above, as described, it may in some cases be used with advantage when the electrodes are supported from beneath. For example, in the tubular electrode construction shown in Figs. 11 and 12, the tubular collecting electrode sections may rest on a suitable support below the same and the metallic rods 28 in that case serve mainly to conduct the current to or from the semi-conducting sections from or to "ground" and also to laterally support the sections so as to ensure alignment of same.

In each of the above described forms of the invention the electrode is of relatively small thickness compared to its height and is, therefore, subject to warping or deformation under the action of heat. Electrical precipitation apparatus are generally used for precipitating suspended material from hot gases passing from kilns or furnaces and the heat of such gases has been found to have a serious effect in warping plates of semi-conducting material, such as cement or concrete, particularly where the said electrodes are supported from their lower ends as the weight of the electrode in that case tends to increase or emphasize the warping action by the buckling action due to gravity after warping has once started. On the other hand, by suspending the electrodes from the top I am enabled to provide a construction in which the electrodes are self-straightening, the tendency of gravity being to hold the electrodes flat and straight and to overcome warping action.

My copending application Serial No. 398,466, filed October 9, 1929, contains claims directed to that form of electrode, as above described, which includes electrode assemblies of cylindrical shape and/or a single metallic support for each electrode element.

I claim:

1. In an electrical precipitator, an electrode of relatively great height and small thickness comprising an elongated metallic suspension member in tensile connection throughout its length, and a plurality of electrode sections of semi-conducting material strung on and substantially completely enveloping said metallic suspension member and supported thereby, each of said sections abutting against each adjacent section so as to provide a substantially continuous electrode surface.

2. In an electrical precipitator, an electrode comprising a plurality of vertical rods each in tensile connection throughout the length, and a plurality of plate sections of high resistance material strung on and substantially completely enveloping said rods, each electrode section engaging a plurality of said rods and each of said sections abutting against each adjacent section so as to provide a substantially continuous electrode surface.

3. A collecting electrode in an electrical precipitator comprising a plurality of vertical metallic rods each in tensile connection throughout its length, and a plurality of plate sections of semi-conducting material mounted on said rods and supported thereby, each of said sections having a plurality of vertical passages for fitting and engaging on a plurality of said rods, said sections of semi-conducting material being disposed contiguously to one another and completely enveloping said metallic rods through the height of the electrode.

4. A collecting electrode in an electrical precipitator comprising a plurality of vertical rods each in tensile connection throughout its length, and a plurality of plate sections of semi-conducting material mounted on said rods and supported thereby, each of said sections having a plurality of vertical passages for fitting and engaging on a plurality of said rods, and comprising in addition, metallic sleeves in the respective vertical passages in the said sections, said metallic sleeves being substantially wholly embedded within the respective sections.

5. In an electrical precipitator, a collecting electrode comprising a plurality of vertical rods each in tensile connection throughout its length, and a plurality of sections of semi-conducting material strung on said rods, and supported thereby, each of said sections abutting each adjacent section and having a plurality of vertical passages through which corresponding vertical rods pass and having metallic sleeves in the respective vertical passages embedded in and in contact with the material of said sections and engaging said rods.

6. In an electrical precipitator, an electrode comprising an elongated metallic member in tensile connection throughout its length, and a plurality of electrode sections of semi-conducting material strung on said metallic member and supported thereby, said electrode sections overlapping one another at the joints between the sections so as to provide walls of semi-conducting material at both sides of said metallic member and over all portions thereof within the limits of said electrode.

7. In an electrical precipitator, an electrode comprising a plurality of vertical elongated metallic members each in tensile connection throughout its length, and a plurality of plate sections of semi-conducting material strung on said metallic members and supported thereby, said sections overlapping one another at the joints between sections and at both sides of said metallic members, so as to provide walls of semi-conducting material at both sides of said metallic members and over all portions thereof within the limits of said electrode.

8. In an electrical precipitator, an electrode comprising a plurality of vertically extending suspension members each in tensile connection throughout its length, a plurality of plate sections of semi-conducting material strung on said suspension members, and a bottom supporting member extending beneath the lowermost of said sections and supporting the weight thereof, said bottom supporting member being connected to and supported by said suspension members.

9. An electrode as set forth in claim 8, said lowermost of the plate sections being recessed at the lower edge thereof to receive said bottom supporting member, and the semi-conducting material thereof extending in front of said bottom supporting member.

In testimony whereof I have hereunto subscribed my name this 2nd day of December, 1926.

EVALD ANDERSON.